US011423022B2

(12) United States Patent
Wen et al.

(10) Patent No.: US 11,423,022 B2
(45) Date of Patent: Aug. 23, 2022

(54) HYBRID DECLARATIVE QUERY COMPILER AND OPTIMIZER FRAMEWORK

(71) Applicant: Oracle International Corporation, Redwood Shores, CA (US)

(72) Inventors: Jian Wen, Hollis, NH (US); Sam Idicula, Santa Clara, CA (US); Nitin Kunal, Zurich (DE); Farhan Tauheed, Zurich (DE); Seema Sundara, Nashua, NH (US); Nipun Agarwal, Saratoga, CA (US); Indu Bhagat, Vancouver (CA)

(73) Assignee: Oracle International Corporation, Redwood Shores, CA (US)

( * ) Notice: Subject to any disclaimer, the term of this patent is extended or adjusted under 35 U.S.C. 154(b) by 572 days.

(21) Appl. No.: 16/016,966

(22) Filed: Jun. 25, 2018

(65) Prior Publication Data
US 2019/0392068 A1 Dec. 26, 2019

(51) Int. Cl.
*G06F 16/24* (2019.01)
*G06F 9/50* (2006.01)
*G06F 16/2453* (2019.01)
*G06F 16/22* (2019.01)

(52) U.S. Cl.
CPC ...... *G06F 16/24545* (2019.01); *G06F 9/5038* (2013.01); *G06F 9/5044* (2013.01); *G06F 16/2282* (2019.01)

(58) Field of Classification Search
CPC .......... G06F 16/24545; G06F 16/2282; G06F 9/5038; G06F 9/5044; G06F 16/2453
See application file for complete search history.

(56) References Cited

U.S. PATENT DOCUMENTS

| 6,549,931 B1 | 4/2003 | Amor et al. |
| 6,820,262 B1 | 11/2004 | Tellez |
| 7,293,011 B1 | 11/2007 | Bedi et al. |
| 7,809,713 B2 | 10/2010 | Su et al. |
| 7,877,373 B2 | 1/2011 | Zait |

(Continued)

FOREIGN PATENT DOCUMENTS

WO WO 2016078592 A1 5/2016

OTHER PUBLICATIONS

Chavan, U.S. Appl. No. 15/873,524, filed Jan. 17, 2018, Final Office Action, dated Aug. 20, 2020.

(Continued)

*Primary Examiner* — Alford W Kindred
*Assistant Examiner* — Cecile H Vo
(74) *Attorney, Agent, or Firm* — Hickman Becker Bingham Ledesma LLP

(57) ABSTRACT

Techniques are described herein for building a framework for declarative query compilation using both rule-based and cost-based approaches for database management. The framework involves constructing and using: a set of rule-based properties tables that contain optimization parameters for both logical and physical optimization, a recursive algorithm to form candidate physical query plans that is based on the rule based tables, and a cost model for estimating the cost of a generated physical query plan that is used with the rule based properties tables to prune inferior query plans.

15 Claims, 8 Drawing Sheets

(56) References Cited

U.S. PATENT DOCUMENTS

| | | | |
|---|---|---|---|
| 7,979,422 B2* | 7/2011 | Belknap | G06F 16/24547 707/713 |
| 9,418,108 B2* | 8/2016 | Jaecksch | G06F 16/24542 |
| 9,747,335 B2* | 8/2017 | Lee | G06F 16/284 |
| 2006/0080285 A1 | 4/2006 | Chowdhuri | |
| 2012/0005190 A1* | 1/2012 | Faerber | G06F 16/24542 707/718 |
| 2013/0173528 A1* | 7/2013 | Betawadkar-Norwood | G06F 16/24535 707/E17.014 |

OTHER PUBLICATIONS

Wen, U.S. Appl. No. 15/581,984, filed Apr. 28, 2017, Final Office Action, dated Aug. 8, 2019.

Wen, U.S. Appl. No. 15/581,984, filed Apr. 28, 2017, Office Action, dated Jan. 9, 2020.

Zhou et al., "Buffering Database Operations for Enhanced Instruction Cache Performance", SIGMOD 2004 Jun. 13-18, 2004, Paris, France. Copyright 2004, 12 pages.

Xin et al., "Shark: SQL and Rich Analytics at Scale", SIGMOD'13, Jun. 22-27, 2013, New York, New York, USA. Copyright 2013 ACM, 12 pages.

Thusoo et al., "Hive A Warehousing Solution Over a MapReduce Framework", VLDB '09, Aug. 24-28, 2009, Lyon, France Copyright 2009, 4 pages.

Pirk et al., "CPU and Cache Efficient Management of Memory-Resident Databases", Proc.—Int. Conf. Data Eng., 12 pages, dated 2013.

P. G. Selinger et al., "Access Path Selection in a Relational Database \Management System,", Proc. 1979 ACM SIGMOD Int. Conf. Manag. data, vol. 3, No. 2, pp. 23-34, 1979.

Neumann, Thomas, "Efficiently Compiling Efficient Query Plans for Modern Hardware", dated Aug. 29, Sep. 3, 2011, Proceedings of the VLDB Endowment, vol. 4, No. 9, 12 pages.

N. Conway, "Query Execution Techniques in PostgreSQL,", dated 2007, 63 pages.

Graefe et al., "The Volcano Optimizer Generator: Extensibility and Efficient Search", in Proceedings of IEEE 9th International Conference on Data Engineering, pp. 209-218, dated 1993.

Dittrich et al., "Efficient Big Data Processing in Hadoop MapReduce", Aug. 27, 2012, Istanbul, Turkey. Proceedings of the VLDB Endowment, vol. 5, No. 12, 2 pages.

Colgan, Maria, "In Memory Parallel Execution in Oracle Database 11gR2", Functionality, dated Sep. 27, 2009, 4 pages.

Wen, U.S. Appl. No. 5/581,984, filed Apr. 28, 2017, Notice of Allowance, dated Nov. 18, 2020.

Chavan, U.S. Appl. No. 15/873,524, filed Jan. 17, 2018, Notice of Allowance, dated Dec. 30, 2020.

* cited by examiner

PATTERN PROPERTY TABLE FOR A HASH-JOIN PATTERN

200

| | Generating a Pattern 201 | | | | Expanding 231 | | | Creating a Physical Query Plan 241 | | | |
|---|---|---|---|---|---|---|---|---|---|---|---|
| ID 202 | Physical Operation Label 206 | Physical Operation Type 210 | Child Count 214 | Child List 218 | Sharing 222 | Shared 226 | Materialize 230 | Part 234 | Number of Rounds 242 | Req. rule 246 | Expression Rule 247 | Materialization Rule 248 |
| 1 203 | PROBE 207 | JPROBE 211 | 2 215 | 2, 3 219 | No | No | Yes 231 | No 235 | N/A 243 | N/A | N/A | N/A |
| 2 204 | BUILD 208 | JBUILD 212 | 1 216 | 3 220 | No | No | No 232 | No 236 | N/A 244 | N/A | N/A | N/A |
| 3 205 | PART 209 | PART 213 | 1 217 | - 221 | No | No | Yes 233 | Yes 237 | <a function computing number of rounds: will override value from the physical property table> 245 | N/A | N/A | N/A |

FIG. 2

PHYSICAL OPERATOR TABLE FOR A PROBE PHYSICAL OPERATOR

300

| Physical Operation Type 301 | Constructor Function 302 | Cost Model Function 303 | Blocking On Input 304 | Blocking On Output 305 | Memory Dep. 306 |
|---|---|---|---|---|---|
| JPROBE 320 | CONSTRUCT_PROB 321 | COST_PROB 322 | YES 323 | NO 324 | YES 325 |

...

| Materialize 307 | Part 308 | Number Of Rounds 309 | Req. Rules 310 | Materialization Rule 311 |
|---|---|---|---|---|
| NO 326 | NO 327 | 1 328 | <a rule function returning TRUE> 329 | <a rule function returning FALSE> 330 |

HYBRID DECLARATIVE QUERY COMPILER AND OPTIMIZER FRAMEWORK

FIELD OF THE INVENTION

The present invention relates to a framework for a hybrid declarative compiler and optimizer allowing support for new algorithms without changing compiler or optimizer code.

BACKGROUND

Database management systems store information in tables in a database. Database operations, such as updating data and retrieving data involve submitting query statements specifying the operations to a database server. The database server processes the queries and performs the specified operations on the data. Processing a query involves parsing the query, generating a set of query plans, selecting the optimal query plan, and sending the optimal execution plan for execution.

A query to a database system is processed internally as a flow of data processing operations. Some examples of such data processing operations are JOIN, GROUP-BY, and PARTITION. The query compiler and optimizer of a database system produce a query plan by optimizing resource utilization within the database system to provide optimal query processing efficiency. Since the query compiler and query optimizer process a query in tandem rather than in isolation, the term compiler is used henceforth to address both the query compiler and the query optimizer.

A query compiler first translates a human-readable query into a logical query plan of descriptive data operations. Subsequently, the compiler converts the logical query plan into a physical query plan for execution by the execution engine. The logical query plan as well as the physical query plan are both usually in a directed acyclic graph (DAG) structure where each node of the graph is a data operation, and each edge of the graph is the flow of data between operations.

The data operation in a logical query plan is a high-level description of the operation, so such an operation cannot be directly processed by the execution engine. Each logical operation is translated into one or more physical operations. Each physical operation contains necessary information for the execution engine to proceed. For example, a logical operation of JOIN can translate into a physical query plan like (PARTITION, HASH-JOIN), or another physical query plan like (SORT, SORT-JOIN).

When a query compiler translates a logical query plan into a physical query plan, the query compiler performs many different optimizations to reach an efficient physical query plan. Optimizations include selecting the correct physical operation plan for each logical operation, setting the properties of each physical operation, and adding necessary auxiliary operations between physical operations.

Such optimizations should be automatically done for any given query, based on the data statistics and available resources. The implementation of such a compiler should also be generic enough for easy extension to support new operations and algorithms.

Many query compilers follow either a greedy or an exhaustive search strategy in determining the sequence of physical operations to be chosen for a given logical operation. In a greedy strategy, a locally optimal choice is made at each stage of the query optimization, aiming for a globally optimal plan. However, often, a greedy strategy produces inefficient low quality plans. On the other hand, with an exhaustive search strategy, the compilation phase often becomes prohibitively slow due to a massive search space.

Declarative compilation provides an alternate approach that yields higher quality query plans without leading to high compilation time. Declarative compilation is a rule-based approach, where rules are used to capture optimization information both for logical operators as well as physical operators. The challenge with declarative compilation is to declare the rules in an extensible way, especially as the number of rules grow over time.

Approaches described herein involve a generic framework for declarative query compilation that facilitates extension of the compiler in an organized and manageable way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a table depicting an example of a Pattern Property Table according to an embodiment.

FIG. 3 is a table depicting an example of a Physical Operator Table according to an embodiment.

DETAILED DESCRIPTION

Figure 1:
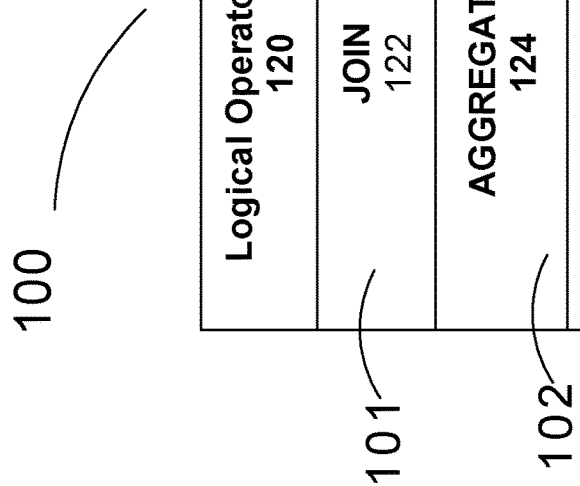
FIG. 1 is a table depicting an example of a Logical Operator Table according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein is a generic framework for declarative query compilation within a database system using both rule-based and cost-based approaches. The rule-based approaches employ a set of rules for compilation and optimization of the query, while the cost-based approaches aim to obtain the cheapest execution plan—possibly one that uses the least amount of resources such as memory, CPU, or I/O, or one with the best time. The generic framework presented herein facilitates extension of the compiler in an organized and manageable way, while allowing simplified tuning of parameters of existing algorithms through a declarative framework. New data operations and algorithms can be added easily using the framework in such a manner that the implementation can be modularized between algorithm designers and query optimizer experts.

The framework may be applied to any DAG-based query compilation and optimization system. Through this framework, maintaining existing operations and adding new operations is simplified. The framework also provides flexibility for easier testing and profiling of query compilation and optimization features in different scopes during the query processing, such as at each individual physical operation, or at each physical operation sub-graph representing a logical operation, or at the whole query level.

As noted previously, a challenge in declarative compilation is the ability to extend the declarative compiler in an organized and manageable way. Within a declarative compiler, rules may not only exist for individual logical operators but may also exist for a certain pattern of operators in the query plan DAG. This makes the declarative compiler very expressive; however, as the number of rules grows over time, manageability is a challenge, since, as rules are incrementally added in the course of the evolution of the query compiler, determining whether a newly added rule interferes with a previously added rule becomes increasingly more complex.

Database systems may solve such challenges mainly using two approaches. A first approach utilizes a carefully implemented plan selection and optimization routine at the code level, like MySQL. Optimization strategies in this approach are implemented as functions that are to be invoked in a predefined order. Adding a new optimization strategy or a new physical operation algorithm is hard since any addition requires a good understanding of the existing optimizer implementation as well as the dependencies between the current set of optimizations. A second approach exposes a programmer-visible rule system to allow customized optimization rules, like PostgreSQL. However, this approach does not support adding new physical algorithms, since adding new physical algorithms requires changes to the internal implementation of the compiler.

Embodiments described herein introduce a declarative approach to solve the above challenges. Specifically, Parameters of each operation (both logical and physical) that are related to optimization are categorized into two groups: "operation-common" parameters and "operation-specific" parameters.

The optimization parameters are controlled by either a cost-based or a rule-based approach or a combination of both.

Adding a new operation will only need to add the operation-specific logic and parameters into the framework. Existing parameters that are shared between the new operation and other existing operations are adopted by the compiler without further code change.

Adding a new algorithm with a different configuration of parameters requires no code change; declarative rules may be written outside of the compiler, and the compiler will load such rules dynamically to control the optimization flow.

Some embodiments of the generic framework described herein include the following three components:

(1) A set of rule-based properties tables. The rule-based property tables contain the optimization parameters for both logical optimization and physical optimization.

(2) A cost model for estimating the cost of a generated physical query plan. This cost model is used together with the rule-based tables to prune inferior query plans.

(3) A recursive algorithm to generate an optimal physical query plan from a received logical query plan, where the optimal physical query plan is based on the rule-based properties tables and the cost model.

The components are described in detail in the following sections.

Rule-Based Properties Tables

Embodiments described herein include Rule-Based Properties Tables. These tables capture the optimization information for both logical optimization and physical optimization. Logical optimization refers to the optimizations involved in converting a logical data operation, such as JOIN, into a specific sequence of physical operations corresponding to algorithms such as a hash-based join algorithm or a sort-based join algorithm. Henceforth, the different algorithms are referred to as "patterns".

Each physical operation is a basic unit of data processing that cannot be further divided into smaller database operations. Each physical operation may be tunable through parameters such as memory consumption, whether to materialize the result into a slower storage layer, etc. Physical optimization then refers to tuning these optimization parameters for each physical operation.

When a query is received at a database system, the query is parsed to generate a logical query plan. In some embodiments described herein, the logical query plan is used to generate a set of candidate physical query plans that may be optimized. The physical optimization results in the selection of an optimal physical query plan. A physical query plan that is generated from the logical query plan is a specific sequence of physical operations forming a directed acyclic graph. This specific sequence of physical operations may be executed within the database system to provide a response to the corresponding query received at the database system.

Rule-based properties are maintained in table-like data structures. Such a table may be implemented in any data structure so long as the table look-up operation and enumeration operation are defined. Each row of the table contains several columns of optimization parameters. Each column represents a property or a rule to be considered when generating the plan. The difference between a property and a rule is that: a rule is triggered in response to satisfying a pre-condition, while a property is always to be observed.

For example, the fact that an operator has a better performance when allocated more processing memory is a property, since this depends on the characteristics of the operator. The decision of whether the result of an operator should be materialized onto persistent storage or pipelined through memory will depend on the usage of the operator. Such a decision is considered a rule, and the necessity associated with materializing the result is the precondition of this rule. This rule will be checked based on the query, and once the rule is triggered (or its precondition is satisfied), the result of that operator will be materialized.

The framework described herein involves defining three the following three tables:

Logical Operator Property Table
Pattern Property Table
Physical Property Table

As noted above, while the example embodiments describe how these tables may be implemented using a two-dimensional row-column representation for the tables, these implementations are in no way meant to be limiting.

Logical Operator Property Table

In some embodiments, there is one global logical operator property table for logical optimization.

FIG. 1 depicts a Global Logical Operator Property Table 100. Each row of this table represents properties associated with a particular logical operation. Columns in a particular row include, without limitations, a Logical Operator Name 120, a Pattern Count 130, and a Pattern Descriptor List 140. Logical Operator Name 120 depicts the name of the logical operator represented in the row. Pattern Count 130 contains the number of different patterns available for selection for the logical operator of that row, and the Pattern Descriptor List 140 contains a list 140 of pointers to the different patterns (each pattern being a specific sequence of physical operations) for executing the logical operator of that row. Two examples are depicted in FIG. 1. In the first example, depicted in row 101, a JOIN logical operator 122 may have links to two (depicted by the count value '2' 132) patterns: a HASH-JOIN pattern 142 and NESTED-LOOP-JOIN pattern 144. In the second example, depicted in row 102, an AGGREGATION operator 124 may have links to three (depicted by the count value '3' 134) patterns: PART-HASH-AGG 146, LOCAL-PART-HASH-AGG 148, and SORT-AGG 150

Pattern Property Tables

According to an embodiment, each pattern required for the execution of a logical operation is represented by a corresponding pattern property table.

FIG. 2 depicts an example of a Pattern Property Table 200. Each row of this table may represent either a logical operator or a physical operation that is used in the pattern.

According to one embodiment, the columns of the Pattern Property Table may be grouped into the following three overall categories: properties for Generating a Pattern 201, properties for Expanding a Pattern 231, and properties for Creating a Physical Query Plan 241.

The properties for Generating a Pattern 201 may be further represented by the following labels:

ID 202, representing a unique identifier for each physical operator.

Physical Operation Label 206, representing a label for the physical operator.

Physical Operator Type 210, representing a type of the physical operator.

Child Count 214 and Child List 218, both representing the directed acyclic graph structure that depicts the flow of execution control in the physical operations when more than one physical operator is required in executing the pattern.

Sharing 222 and Shared 226, representing two sharing properties used to capture the result sharing information. These properties represent the fact that the depicted DAG structure permits sharing the result of a physical operator. Sharing 222 shows the identifiers of the one or more operators whose results are provided as inputs to the current operator, i.e., the physical operator represented by the Physical Operation Label of the row, while Shared 226 shows the identifiers of the one or more physical operators to whom the output of the current operator are provided as input.

While the Pattern Property Table 200 does not depict any operators whose shared or sharing properties are set to YES, a commonly used optimization of Group-by and Join operations is to share the hash table between these two operations. To represent this pattern, the HASH_GROUP_BY operator will have its "Shared" property as YES, while the HASH_JOIN operator will have its "Sharing" property as YES for sharing the hash table from HASH_GROUP_BY operator.

The properties for Expanding a Pattern 231 are variables with different possible options when forming a physical query plan. Expanding the pattern requires examining the options of each property to generate different physical query execution plans. These properties are represented by the following labels:

Materialize Property 230, representing whether the specific physical operator should materialize its results to persistent storage. When this property is true, the plan generation will generate two physical query plans, one plan materializing the result and other plan involving not materializing the result, and then the system will pick the physical query plan that optimizes the cost.

Part Property 234, representing whether the specific physical operator should partition its input data to utilize in-operator parallelism or not partition its input data.

The properties for Creating a Physical Query Plan 241 are used to initialize the physical operators of a pattern according to the requirements of the pattern. These properties are a subset of the values specified in the Physical Property Table, such as the one depicted in FIG. 3, and the values in the Pattern Property Table will override the default values specified in the Physical Property Table. These properties are represented by the following labels:

Number of Rounds 242, representing a property that instructs the plan generator to create multiple rounds of the specific operator. This is commonly used by PARTITION operator where the number of partitions to be created in one round is limited by the system resources, so multiple rounds of partitioning are needed to achieve the expected number of partitions.

Req Rule 266, representing a property that is used to specify whether or not the operator is required in a pattern. Required operators must be present in the generated plan irrespective of the data properties. A non-required operator may be either added or skipped, depending on the data properties and cost preferences. For example, an SORT operator is not required in a group-by pattern before the GROUP-BY operator. However, for a dataset with high key cardinality, presence of the SORT operator in the pattern will benefit performance since presence of this operator may help to avoid expensive hash-based group-by operations.

Expression Rule 247, representing a property that is used to specify whether arithmetic expressions should be processed by inserting an EXPRESSION physical operator. A rule is defined by two function pointers; one function pointer is for a pre-condition check and the other function pointer is for the actual rule action. The framework will first check to evaluate if the pre-condition is satisfied; the action function is only executed when the pre-condition is satisfied. In addition, if a physical operator has different values for this property between corresponding entries in the Pattern Property Table and the Physical Property Table, the value in the Pattern Property Table will be adopted if the physical operator is initialized as part of a pattern. Otherwise, the value from the Physical Property Table will be adopted as a default setup value.

The Materialization Rule 248, representing a property that is used to specify whether the output of the operator should be materialized before sending the output value to the next operator. This is useful for creating checkpoints for recovery purposes.

The Pattern Property Table 200 in FIG. 2 depicts an example of a pattern table for a hash-join algorithm. The pattern example contains three physical operators (no logical operators are depicted in this example), rooted at a JPROBE-type PROBE operator for probing the hash table. The three physical operators depicted in FIG. 2 for the example are PROBE 207 (of ID: 1 202, type JPROBE 211), BUILD 208 (of ID: 2 203, type JBUILD 212), and PART 209 (of ID: 3 203, type PART 213).

The DAG plan structure is described by CHILD COUNT values: '2' 215, '1' 216, and '1' 217, and CHILD LIST values: '2, 3' 219, '3' 220, 221. The specific values describe a structure in which the physical operator PROBE has two child nodes (BUILD and PART), while the physical operator BUILD has one child node (PART) and the physical operator PART has one child node, the child node not present in this pattern table. The DAG structure can be explained by the following topology:

PROBE (1)←BUILD (2)←PART (3)←( . . . )
|PART (3)←( . . . )

Thus, in this exemplary topology, PROBE (ID: 1) has two child branches, both of which have PART (ID: 3) in it. In case of the BUILD (ID: 2) branch, PART is a GRAND-CHILD; but in the other branch, PART is a CHILD. Note that this depicts two instance of PART.

As depicted by the values of 'NO' for both the SHARING 222 as well as the SHARED 226 properties for the three physical operators PROBE 207, BUILD 208, and PART 209, there is no sharing of the results of any of the three physical operators within the depicted DAG structures in the example pattern in FIG. 2.

In the Number of Rounds 242 category, the example depicts values of 'N/A' 243 for the PROBE 207 physical operator and 'N/A' 244 for the BUILD 208 physical operator. However, for the PART 209 physical operator, the value in the pattern table is depicted as 'A function computing the number of rounds: will override the value obtained from the corresponding entry in the physical property table' 245.

In the categories of Req. Rule 246, Expression Rule 247, and Materialization Rule 248, the values depicted are 'N/A' for the three physical operators.

Physical Operator Property Table

According to an embodiment, the physical property table captures a default set of values for each physical operator. FIG. 3 depicts a Physical Property Table 300. The values stored in the physical property table are used when initializing a physical operator in a default setup. Values of the properties that are common between the physical property tables and the pattern property tables may be overridden by the values in the pattern property tables. The properties that are common between pattern property tables and physical property tables include properties such as Materialize Property 252 and the Part Property 254 from the category of Properties for Expanding 250 in the Pattern Property Table 200, as well as the Number Of Rounds Property 261, the Required Rule Property 262, and the Materialization Rule Property 264 from the category of Properties For Creating A Physical Query Plan 260 in the Pattern Property Table 200. However, the physical property tables also contains non-pattern specific information for creating physical operators. These properties may include the following:

Blocking on Input and Blocking on Output: these properties are used to describe whether the operator requires its input or output to be completed before further processing. If an operator is blocking on input, the operator requires that its input data to be available before processing the input. An operator is blocking on output when the operator requires that the operator's data processing should be finished before moving to the next operator, so the output from this operator must not be directly pipelined to the next operator. For example, the SORT operator is an example of blocking on both input and output, since the operator must only start sorting after getting the input data, and the operator must not send the output results till all the input data is received and sorted.

Memory Dep: this is a property related to whether the performance of the operator depends on the memory resources. Operators with this property should be assigned with as much memory as is feasible in order to improve their performance efficiency.

Cost Model Function: specifies the function pointer for computing the estimated cost of the physical operator. The details of cost models for the physical operators is discussed in the next section.

The Physical Operator Table 300 in FIG. 3 depicts an example of a table for generating the physical operator PROBE. Entries depicted include a value of JPROBE 320 for Physical Operator Type 301, CONTRUCT_PROBE 321 for Constructor Function 302, COST_PROB 322 for Cost Model Function 303, "YES' 323 for Blocking on Input 304, 'NO' 324 for Blocking On Output 305, and 'YES' 325 for Memory Dep. 306. The entries that are common with the pattern property table in the physical operator table include Values for Materialize 307 (set to 'NO' 326), Part 308 (set to 'NO' 327), Number of Rounds 309 (set to '1' 328) Req. Rules 310 (set to '<a rule function returning TRUE>' 329), and Materialization Rule 311 (set to '<a rule function returning FALSE>' 330).

Physical Operation Plan Cost Model

For a given logical query plan, there may be multiple candidates for the corresponding physical query plan. This is due to the feature that a logical operator in a logical query plan may have multiple patterns and a pattern, in turn, may be expanded into multiple plans based on the varying options in the expanding properties in the Pattern Property Tables.

One way to select the best physical query plan among these candidates is to compute estimated costs associated with each candidate physical query plan, and choose the plan with the best cost.

In an embodiment described herein, the cost model may estimate the time cost of a physical data processing operation based on specific physical properties.

For each physical operator, without limiting the definition of the cost model, its cost model may be described as a function of following parameters:

Input data size.

Processing memory assigned to this physical operator.

Values of properties defined in the Physical Property Table—these values could be either from the Physical Property Table by default, or from a Pattern Property Table when overwritten.

Parameters of system environment, such as the CPU speed, network throughput, memory bandwidth, etc.

The output of the cost model formula in the above described embodiment is an estimated time cost. The cost of a physical query plan containing multiple physical operators may be computed as a combination of the individual physical operator costs.

Physical Query Plan Generation Algorithm

This section describes some embodiments of the algorithms for generating physical query plans for a given logical query plan, based on the information from property tables such as depicted in FIGS. 1, 2, and 3, and a cost model.

In some embodiments, when a query, such as an SQL query, is received at a database system, the received query is first parsed in order to obtain one or more logical query plans that may be relational algebra expressions.

Figure 4:
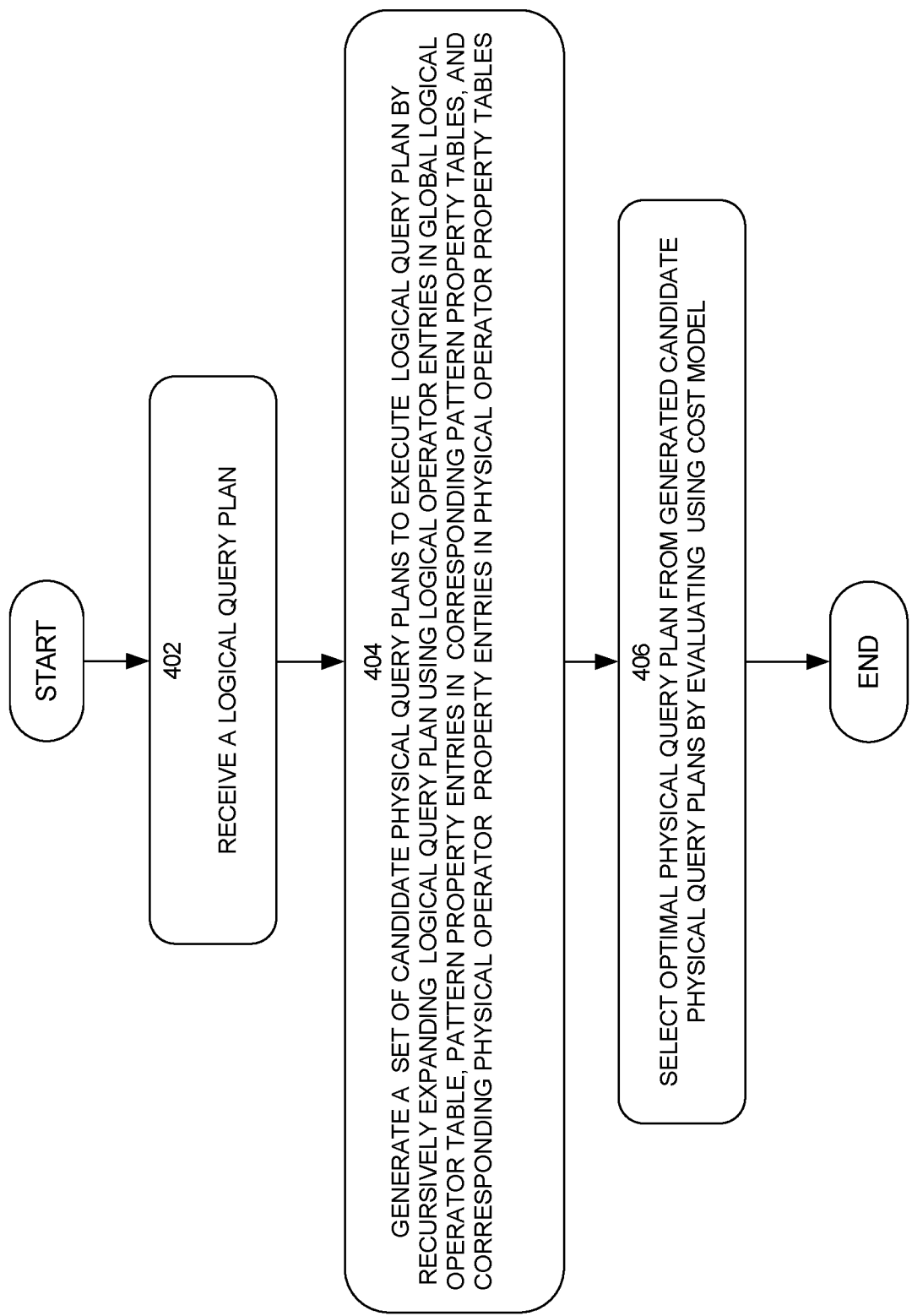
FIG. 4 is a flowchart depicting the algorithm for the generation of a physical query plan for a given logical query plan according to an embodiment.

FIG. 4 depicts an embodiment of the overall flowchart for generating a corresponding physical query plan from each such logical query plan.

In step 402, a logical query plan is received by the system.

In step 404, a set of candidate physical query plans to execute the received logical query plan are generated. Generating the plans involves expanding the logical query plan using logical operator entries in the global logical operator table, pattern property entries in corresponding pattern properties tables, and physical operator property entries in the corresponding pattern property tables.

In step 406, the generated candidate physical query plans are evaluated using a cost model in order to select an optimal physical query plan.

The selected optimal physical query plan is then executed by the database system to provide a response to the query received at the database system. Based on the logical and physical optimization parameters that are selected in the rule-based properties tables as well as the cost model used during the generation of the optimal physical query plan, execution of the selected optimal physical query plan improves the functionality and performance of the database system by optimizing one or more of CPU speed, network throughput, memory bandwidth, etc. while providing the response.

According to one embodiment, the overall procedure that is summarized as step 404 in FIG. 4 may involve the following steps:
1. For each logical operation in the given logical query plan, a Global Logical Operator Property Table (such as depicted in FIG. 1) is looked up in order to obtain a list of patterns that may be used to execute the logical operation.
2. For each pattern obtained from the list of patterns in the Global Logical Operator Property Table, a corresponding Pattern Property Table (such as depicted in FIG. 2) is retrieved in order to obtain a list of further logical operators and/or physical operators to execute the pattern. The logical operators are expanded recursively using the Global Logical Operator Property Table and corresponding Pattern Property Table till the recursively obtained logical operators are expanded to a set of physical operators, thereby obtaining corresponding candidate physical query plans
3. For each physical operator listed in the Pattern Property Table, the operator is initialized based on the property in the Pattern Property Table. If some property is not specified in the Pattern Property Table, the default value is obtained from the Physical Property Table.

For the first step, the top-level recursion is started over each of the logical operators in the given logical query plan. Algorithm 1 shown below describes this procedure. Specifically, this algorithm retrieves possible patterns for a given logical operator from the Logical Property Table, and expands each pattern into multiple patterns according to the expanding properties in the corresponding Pattern Property Table. Each of the generated patterns is used later to generate the physical query plan.

The pseudo-code below depicts the Top-Level Recursion for Plan Generation Algorithm:

```
For each Logical operation node Q in plan D
{
    C = Initialized context information
    Info = Extract logical information from Q
    Pattern_list = Generate_pattern (Info,
                                    Logical_Property_Table)
    For each pattern P in Pattern_list
        Expand P based on the expanding options in
        Pattern_Property_Table, and put the patterns into
        Pattern_search_space
    For each pattern P in Pattern_search_space
    {
        Child_count = Get_Child_Logical_Nodes_count (Q)
        /* Obtain plans for child logical nodes of Q by recursively
        running this algorithm (i.e., Top-Level Recursion for Plan
        Generation Algorithm) on Q's child-logical-node. Results are
        stored in Global_Log_to_Phy_Map. There may be multiple plans.*/
        Child_QPlans = Get_Child_QueryPlan(Q)
        For each Child_QPlan in Child_QPlans
        {
        /* Generating physical query plan using algorithm: Generate
        Physical Query Plan for Each Pattern. Returned query plan is
        self-sufficient and executable */
            Phys_QPlan = Create_Physical_Plan (C, P,
                                            Child_QPlan)
        /* Add generated physical query plan QPlan to global map of form
        <logical operation, list of physical query plans> */
            Global_Log_to_Phy Map[Q].add(Phys_QPlan)
        }
    }
}
```

Top Level Recursion for Plan Generation Algorithm: Pseudo-Code

After patterns are obtained from the Top-Level Recursion for Plan Generation Algorithm, in the second step, each pattern will be recursively examined for generating a corresponding physical query plan. The recursion follows a depth-first fashion, so for a physical operator in a pattern, the algorithm starts generating physical query plans for its child physical operators. The algorithm performs by collecting the physical query plan information of child physical operators, and uses the collected information as the context for generating the physical query plan of the current physical operator. The Generate Physical Query Plan for Each Pattern Algorithm and Populate Each Physical Operator Algorithm shows the details of this procedure. Specifically, the Generate Physical Query Plan for Each Pattern Algorithm shows the top level of the recursion on each pattern. This function will be called on each pattern of each logical operator, assuming child logical operators and their patterns have been generated. The Populate Each Physical Operator Algorithm describes the procedure of generating physical operators recursively following a pattern.

The pseudo-code for the Generate Physical Query Plan for Each Pattern Algorithm is shown below:

```
Create_Physical_Query_Plan
(
    C,                      /* Context & book keeping information */
    P,                      /* Root of Current pattern */
    Child_physical_query_plans      /* List of child physical
query plans */
)
{
```

```
/* Merge children's context (state, bookkeeping information)
into context C */
    Merge_context (C, P, Child_physical_query_plans)
/* Recursively process each physical operator of this pattern
using algorithm: Process_Pattern_Recur */
    Return Process_Pattern_Recur(C, P,
Child_physical_query_plans)
}
```

Generate Physical Query Plan for Each Pattern Algorithm: Pseudo-Code

Next, the pseudo-code for the Populate Each Physical Operator Algorithm shown below:

```
/* Process each node or physical operator in pattern P and
create corresponding physical query plan */
Process_Pattern_Recur(C, P, Child_physical_query_plans)
{
/* Depth-first processing: generate child physical patterns
first */
    Child = Process_Pattern_Recur(C, P->child,
Child_physical_query_plans)
/* Returns pointer to root node of physical query plan
corresponding to Physical operator of pattern P
    Physical_query_plan = Create_Physical_Operator (C, P,
    Child_physical_query_plans)
    Sib = Process_Pattern_Recur (C, P->sibling,
                                    Child_physical_query_plans)
    // Link child plan
    PLAN_CHILD (Physical_query_plan) = Child
    // Link the sibling plan
    PLAN_SIBLING (Physical_query_plan) = Sib
    Return Physical_query_plan;
}
```

Populate Each Physical Operator Algorithm: Pseudo-Code

In one embodiment, when the approach recursively generates physical operators in a physical query plan, the approach considers properties from both Pattern Property Table and the Physical Property Table. The Physical Property Table contains the default values to be used if Pattern Property Table has not overridden the values. Thus, the third step involves executing the Initialize Physical Operator Algorithm. The pseudo-code for the Initialize Physical Operator Algorithm is shown below:

```
Create_Physical_Operator (C, P)
{
    Pattern_property_table = get_pattern_prop_table(C)
    Global_property_table = get_global_table ( )
/* Generate arguments specific for physical operator */
    phy_create_arguments = ...
/* Pick correct create function from either pattern specific
table, or from global table. "CREATE_FUNC" is used to search for
the create function pointer in corresponding table */
    If (implemented_in_pattern_prop_table (
        pattern_property_table, CREATE_FUNC))
    {
        fn_ptr = get_fn_from_pattern_prop_table (
                pattern_prop_table, CREATE_FUNC);
    }
    Else
    {
        fn_ptr = get_fn_from_global_prop_table (
                global_prop_table, CREATE_FUNC);
```

```
    }
/* Create physical operator through the function pointer
retrieved from table */
    Return fn_ptr(phy_create_arguments);
}
```

Initialize Physical Operator Algorithm: Pseudo-Code

One example of having a pattern-specific property setup and a global default property setup is with respect to the materialization rule. The materialization rule decides whether some input of a physical operator should be materialized late to avoid unnecessary I/O on the slower storage layer. Usually a physical operator decides this materialization flag based on its own characteristics. But there are operators whose result may be either materialized or not, depending on the pattern (algorithm) that the operators participate in. For example, a TABLE_SCAN operator followed by a FILTER operator will load the filtering columns first and load other columns lazily after the filter is processed, so that the operator only needs to load the unfiltered data for the other columns. Although the materialization rule for TABLE_SCAN may be "always load everything" in the default setup, the rule will be "load filter columns first" in this FILTER algorithm.

Maintaining and Tuning the Framework

Maintaining and tuning a DAG-based query compiler framework such as described herein involves the following:

One embodiment for maintaining the framework is described below:

Adding a new logical operator and a pattern: this requires a new entry in the Logical Property Table. If the required physical operators are implemented, it is just required to add a new Pattern Property Table entry for this new pattern, and describe the physical query plan structure in this table.

Figure 5A:
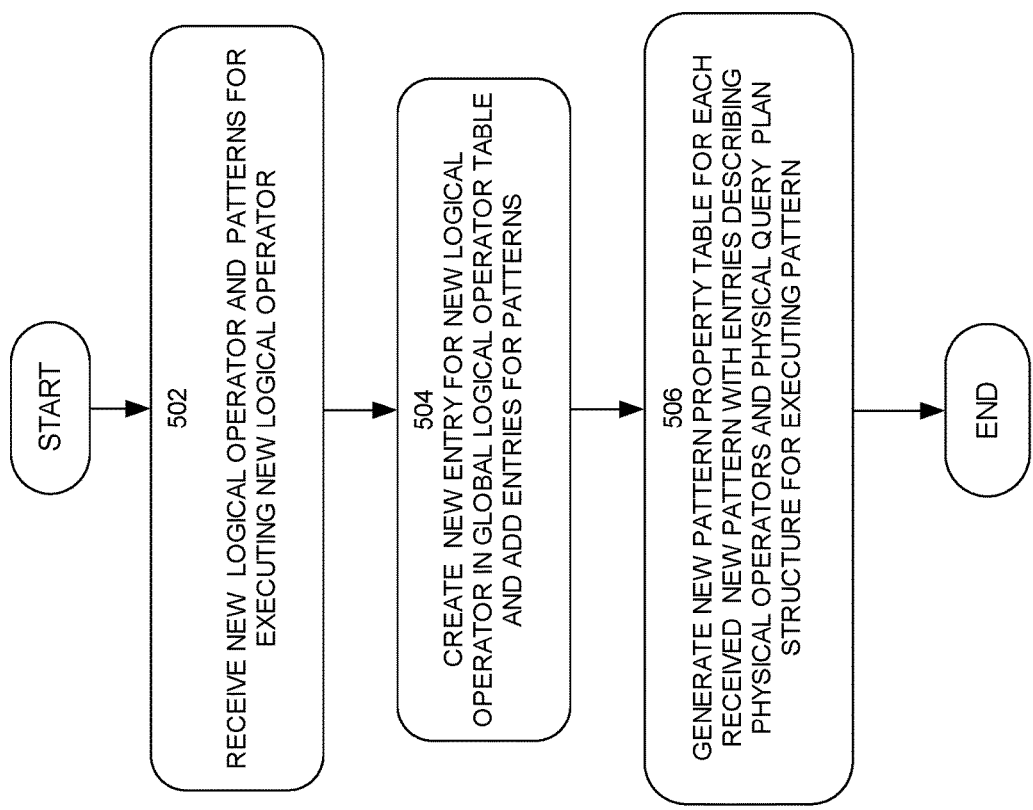
FIG. 5A is a flowchart depicting the algorithm for adding a new logical operator and a new pattern to the declarative query compiler framework according to an embodiment.

FIG. 5A depicts the flowchart for adding a new logical operator and a new pattern in this framework. Step 502 depicts receiving a new logical operator and corresponding patterns for executing the new logical operator. Step 504 depicts creating a new entry for this new logical operator in the global logical operator table and adding entries for the received patterns. Step 506 depicts generating pattern property table for each new received pattern—where the entries in the pattern property table describe the physical operators as well as the physical query plan structure for executing the pattern.

Adding a new physical operator: this requires at least a new entry in the Physical Property Table to describe the default parameters of this new operator. If this operator has been used in a pattern, an entry for this operator is generated in the Pattern Property Table for that pattern, and overridden properties and rules are defined in the table.

Figure 5B:
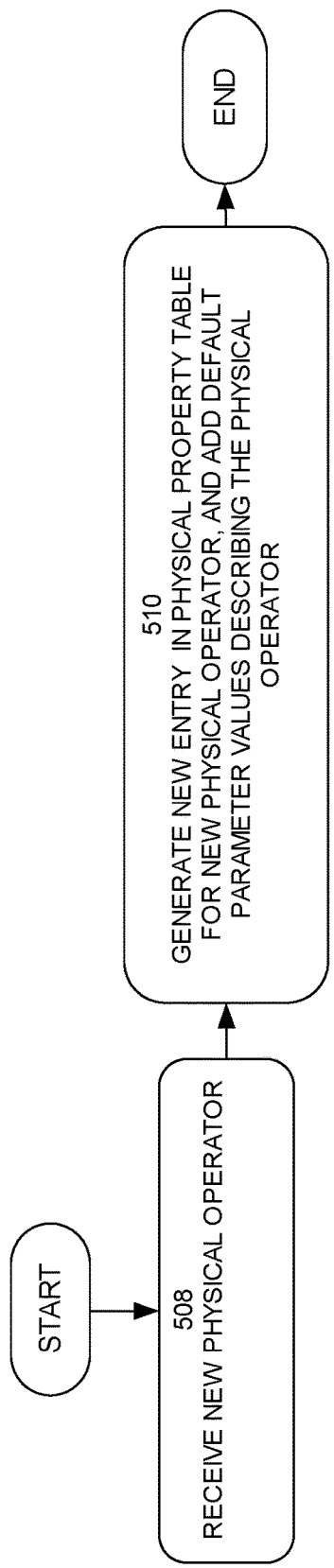
FIG. 5B is a flowchart depicting the algorithm for adding a new physical operator to the declarative query compiler framework according to an embodiment.

FIG. 5B depicts the flowchart for adding a new physical operator in this framework. Step 508 depicts receiving a new physical operator. Step 510 depicts generating a new entry in the physical property table for the new operator and corresponding default parameter values for this physical operator.

Adding a new rule: a new rule may be appended to the corresponding table (Pattern Property Table or Physical Property Table). Once the function pointers to the precondition and the action of this rule are added to the table, the framework will pick up this new rule automatically during the optimization.

Figure 5C:
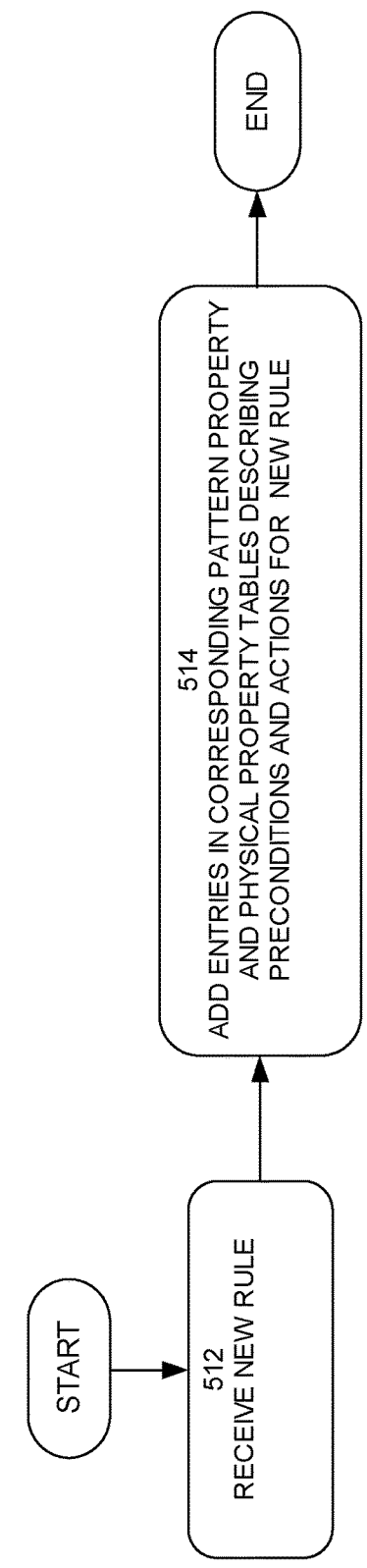
FIG. 5C is a flowchart depicting the algorithm for adding a new rule to the declarative query compiler framework according to an embodiment.

FIG. 5C depicts the flowchart for adding a new rule. Step 512 depicts receiving a new rule. Step 514 depicts adding entries for the new rule in corresponding pattern property and physical property tables. These entries describe the preconditions and actions that are associated with the new rule.

According to one embodiment for tuning the framework:
Properties in the Physical Property Table may be updated to change the global behavior of a physical operator. Updating or adding new entry into the Pattern Property Table may also possibly only affect certain patterns.
The cost model may be tuned since the model is a standalone component. Since the model picks up the properties either from the generated physical query plan or the property tables, any change in the properties or rules will be picked up by the cost model.

Advantages Over Other Approaches

Previous query compilation and optimization techniques have been proposed to decide the best access path through a cost-based approach. Some optimization techniques separate the optimization stages into two stages—generating logical algebra for the query followed by physical query execution plans. Policy guided query optimization procedures map from logical query plans to physical query plans. The focus on the embodiments presented herein is on extensibility as well as ease of maintenance and tuning. The present framework organizes optimization parameters in configurable tables, so that maintaining and updating the query processing system may occur with minimal changes to the compiler code. This provides a significant improvement to a database's compiler and optimizer.

Recent approaches in generating machine code during query compilation provide some declarative power to the modern database compiler and optimizer. The approaches involve code-generation of each physical operator at compilation time, so the code may be optimized to specific hardware. Embodiments presented here differ in that declarative components presented here are parameter based, instead of operator-code-generation based. So it is also possible to plug in the operator-based code generation into the framework, and still utilize the power of parameter tuning provided by the framework.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing Overview

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Query Optimization Overview

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e. one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

Multi-Node Database Management System

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Software Overview

Figure 6:
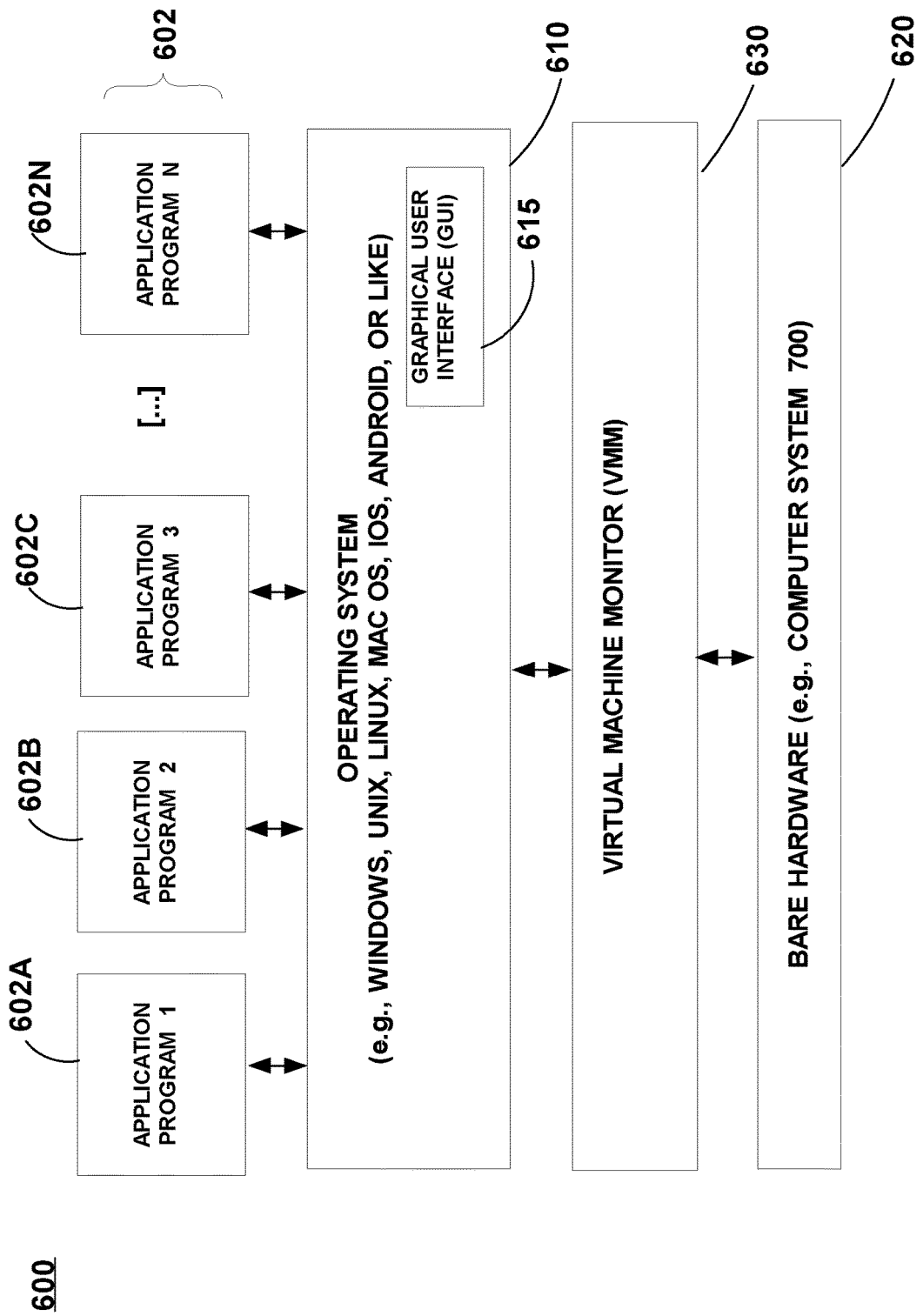
FIG. 6 is a diagram depicting a software system that may be used in an embodiment.
Figure 7:
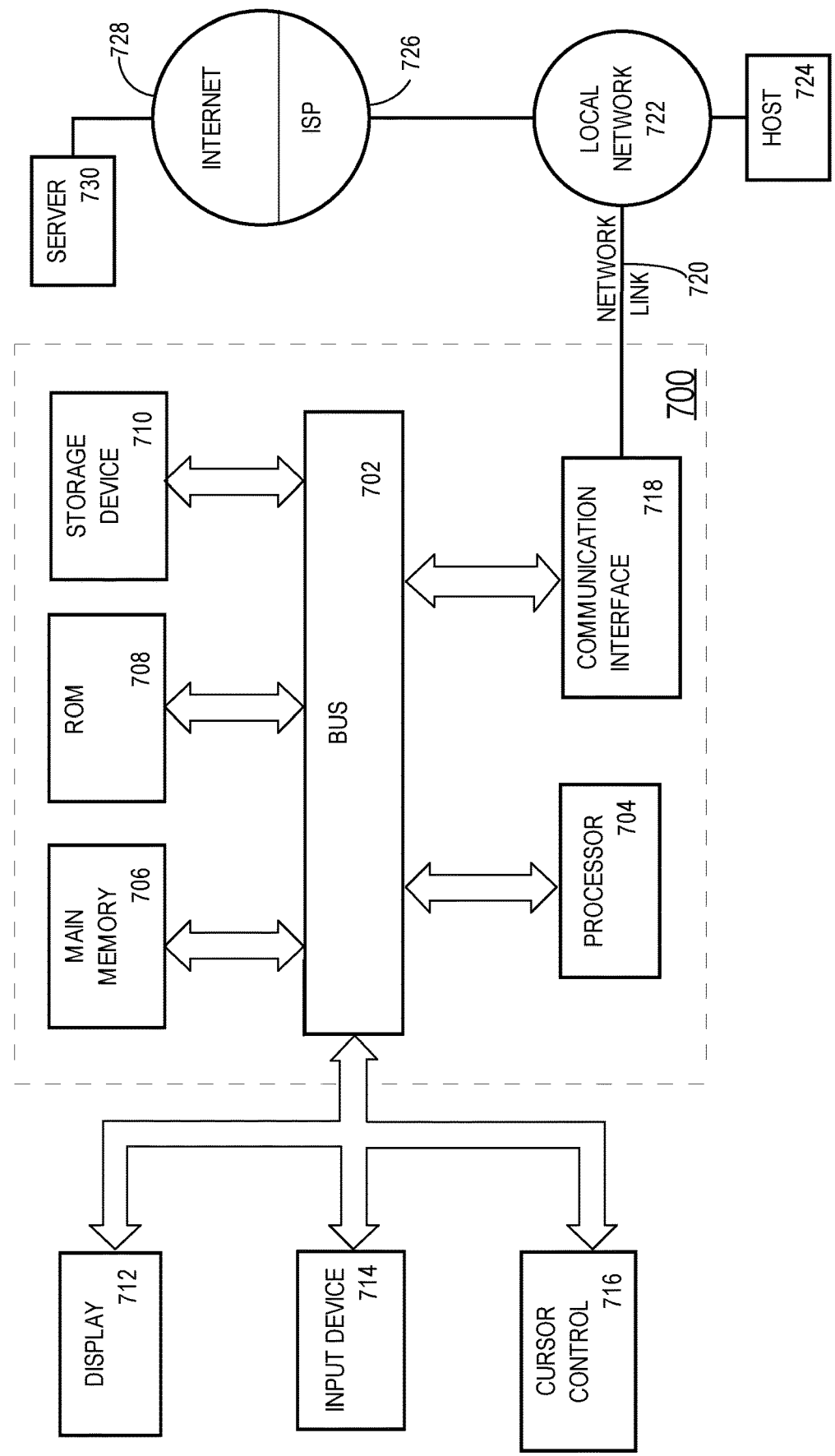
FIG. 7 is a diagram depicting a computer system that may be used in an embodiment.

FIG. 6 is a block diagram of a basic software system 600 that may be employed for controlling the operation of computing system 700 of FIG. 7. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

FIG. 6 is a block diagram of a basic software system 600 that may be employed for controlling the operation of computing system 700 of FIG. 7. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system (OS) to run as if the guest OS is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating a physical query plan for a logical query plan in a database system, comprising:
receiving the logical query plan, wherein the logical query plan describes operations for executing a received query in the database system;
generating a set of candidate physical query plans for the logical query plan based on expanding the logical query plan by using entries from tables comprising:
for each logical operator of one or more logical operators in the logical query plan, obtaining, from a logical operator property table corresponding to said each logical operator, respective one or more patterns for executing each logical operator:
for each pattern obtained from the logical operator property table for executing said each logical operator;
expanding said each pattern based on respective one or more values obtained from a pattern property table corresponding to said each pattern, wherein the respective one or more values specify corresponding one or more physical properties associated with one or more physical operators used to execute said each logical operator;
for each physical operator of the one or more physical operators used to execute said each logical operator, initializing values for one or more physical properties associated with said each physical operator for executing said each logical operator based on said respective one or more values;
selecting a physical query plan from the set of candidate physical query plans using a cost model;
wherein the selected physical query plan is executed in the database system to provide a response to the query;
wherein the method is performed by one or more computing devices.

2. The method of claim 1, wherein the logical operator property table is a global table, with row entries in a row each comprising:
a logical operation;
a pattern count of different patterns; and
pointers to different patterns, wherein each of the different patterns may be used to execute the logical operation.

3. The method of claim 1, wherein the one or more pattern property tables each corresponds to a respective pattern for executing a logical operation, and wherein entries in said pattern property table may be updated to modify execution of a logical operation, wherein said one or more pattern property tables include said pattern property table.

4. The method of claim 3, wherein said pattern property table comprises:
one or more row entries, wherein each row corresponds to a respective operation in the respective pattern of said pattern property table; and
column entries comprising:
properties for generating the respective pattern of said pattern property table;
properties for expanding the respective pattern of said pattern property table; and
properties for creating a physical query plan for the respective pattern of said pattern property table.

5. The method of claim 4, wherein properties for generating the respective pattern of said pattern property table comprises entries:
describing physical operations used to execute the respective pattern of said pattern property table; and
describing a structure of a directed acyclic graph used to execute the respective pattern of said pattern property table.

6. The method of claim 4, wherein the properties for expanding the respective pattern of said pattern property table comprises entries for variables with optional values to be used when forming a physical query plan for executing the respective pattern of said pattern property table.

7. The method of claim 4, wherein the properties for creating a physical query plan for the respective pattern of said pattern property table comprises entries for initializing values for physical operations according to requirements of the respective pattern of said pattern property table.

8. The method of claim 1, wherein the cost model comprises combining an estimated time cost associated with executing each physical operator in a physical query plan.

9. One or more non-transitory storage media storing instructions which, when executed by one or more processors, cause the one or more processors to perform a method for generating a physical query plan for a logical query plan in a database system, the method comprising:
receiving the logical query plan, wherein the logical query plan describes operations for executing a received query in the database system;
generating a set of candidate physical query plans for the logical query plan based on expanding the logical query plan by using entries from tables comprising:
for each logical operator of one or more logical operators in the logical query plan, obtaining, from a logical operator property table corresponding to said each logical operator, respective one or more patterns for executing each logical operator;
for each pattern obtained from the logical operator property table for executing said each logical operator;
expanding said each pattern based on respective one or more values obtained from a pattern property table corresponding to said each pattern wherein the respective one or more values specify corresponding one or more physical properties associated with one or more physical operators used to execute said each logical operator;
for each physical operator of the one or more physical operators used to execute said each logical operator, initializing values of one or more physical properties associated with said each physical operator for executing said each logical operator based on said respective one or more values;
selecting a physical query plan from the set of candidate physical query plans using a cost model; and
wherein the selected physical query plan is executed in the database system to provide a response to the query.

10. The non-transitory computer-readable storage medium of claim 9, wherein the logical operator property table is a global table, with row entries in a row each comprising:

a logical operation;

a pattern count of different patterns; and pointers to different patterns, wherein each of the different patterns may be used to execute the logical operation.

11. The non-transitory computer-readable storage medium of claim claim 9, wherein one or more pattern property tables each corresponds to a respective pattern for executing a logical operation, and wherein entries in said pattern property table may be updated to modify execution of a logical operation, wherein said one or more pattern property tables include said pattern property table.

12. The non-transitory computer-readable storage medium of claim 11, wherein said pattern property table comprises:

one or more row entries, wherein each row corresponds to a physical operation in the respective pattern of said pattern property table; and column entries comprising:

properties for generating the respective pattern of said pattern property table;

properties for expanding the respective pattern of said pattern property table; and properties for creating a physical query plan for the respective pattern of said pattern property table.

13. The non-transitory computer-readable storage medium of claim 12, wherein properties for generating the respective pattern of said pattern property table comprises entries:

describing physical operations used to execute the respective pattern of said pattern property table; and describing a structure of a directed acyclic graph used to execute the respective pattern of said pattern property table.

14. The non-transitory computer-readable storage medium of claim 12, wherein the properties for creating a physical query plan for the respective pattern of said pattern property table comprises entries for initializing values for physical operations according to requirements of the respective pattern of said pattern property table.

15. The non-transitory computer-readable storage medium of claim 9, wherein the cost model comprises combining an estimated time cost associated with executing each physical operator in a physical query plan.

* * * * *

UNITED STATES PATENT AND TRADEMARK OFFICE
CERTIFICATE OF CORRECTION

| | | |
|---|---|---|
| PATENT NO. | : 11,423,022 B2 | Page 1 of 1 |
| APPLICATION NO. | : 16/016966 | |
| DATED | : August 23, 2022 | |
| INVENTOR(S) | : Wen et al. | |

It is certified that error appears in the above-identified patent and that said Letters Patent is hereby corrected as shown below:

In the Specification

In Column 5, Line 25, delete "150" and insert -- 150. --, therefor.

In Column 7, Line 20, delete "|PART" and insert -- |←PART --, therefor.

In Column 9, Line 53, delete "plans" and insert -- plans. --, therefor.

In the Claims

In Column 21, Line 25, in Claim 1, delete "operator;" and insert -- operator: --, therefor.

In Column 21, Line 36, in Claim 1, delete "for" and insert -- of --, therefor.

In Column 21, Line 54, in Claim 3, after "wherein" delete "the", therefor.

In Column 21, Line 63, in Claim 4, delete "respective" and insert -- physical --, therefor.

In Column 22, Line 26, in Claim 9, delete "storage media" and insert -- computer-readable storage medium --, therefor.

In Column 22, Line 41, in Claim 9, delete "operator;" and insert -- operator: --, therefor.

In Column 22, Line 44, in Claim 9, delete "operator;" and insert -- operator: --, therefor.

In Column 22, Lines 47-48, in Claim 9, delete "pattern" and insert -- pattern, --, therefor.

In Column 23, Line 6, in Claim 11, delete "claim claim" and insert -- claim --, therefor.

Signed and Sealed this
Twenty-first Day of February, 2023

*Katherine Kelly Vidal*

Katherine Kelly Vidal
*Director of the United States Patent and Trademark Office*